(12) United States Patent
Kashyap (10) Patent No.: US 7,085,890 B2
(45) Date of Patent: Aug. 1, 2006

(54) MEMORY MAPPING TO REDUCE CACHE CONFLICTS IN MULTIPROCESSOR SYSTEMS

(75) Inventor: Sujatha Kashyap, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 10/782,362

(22) Filed: Feb. 19, 2004

(65) Prior Publication Data

US 2005/0188157 A1      Aug. 25, 2005

(51) Int. Cl.
*G06F 12/08* (2006.01)

(52) U.S. Cl. ......................... 711/130; 711/136
(58) Field of Classification Search ............... 711/130, 711/136, 203, 3
See application file for complete search history.

(56) References Cited

U.S. PATENT DOCUMENTS

| 5,630,097 A | 5/1997 | Orbits et al. |
| 5,860,095 A | 1/1999 | Iacobovici et al. |

FOREIGN PATENT DOCUMENTS

| JP | 2001216140 A | 8/2001 |
| JP | 2001282547 A | 10/2001 |
| JP | 2002342163 A | 11/2002 |

OTHER PUBLICATIONS

Jian Huang, et al.; Page-Mapping Techniques for CC-NUMA Multiprocessors; 1997; pp. 91-104; (0-7803-4229-1/97 1997 IEEE); US.

Rui Min, et al., Improving Performance of Large Physically Indexed Caches by Decoupling Memory Addresses from Cache Addresses, Nov. 2001, vol. 50, No. 11; IEEE Transactions; US.

Jack L. Lo, et al.; An Analysis of Database Workload Performance on Simultaneous Multithreaded Processors; US.

R. E. Kessler et al.; Page Placement Algorithms for Large Real-Indexed Caches; Nov. 1992; pp. 338-359; vol. 10, No. 4; ACM Transactions on Computer Systems; US.

Jochen Liedtke; Colorable Memory; Nov. 10, 1996; pp. 1-4; IBM; US.

*Primary Examiner*—Hiep T. Nguyen
(74) *Attorney, Agent, or Firm*—H. Artoush Ohanian; Marilyn S. Dawkins; Biggers & Ohanian, LLP (57) ABSTRACT

Methods, systems, and computer program products are disclosed for mapping a virtual memory page to a real memory page frame in a multiprocessing environment that supports a multiplicity of operating system images. Typical embodiments include retrieving into an operating system image, from memory accessible to a multiplicity of operating system images, a most recently used cache color for a cache, where the cache is shared by the operating system image with at least one other operating system image; selecting a new cache color in dependence upon the most recently used cache color; selecting in the operating system image a page frame in dependence upon the new cache color; and storing in the memory the new cache color as the most recently used cache color for the cache.

20 Claims, 4 Drawing Sheets

MEMORY MAPPING TO REDUCE CACHE CONFLICTS IN MULTIPROCESSOR SYSTEMS

BACKGROUND OF THE INVENTION

1. Field of the Invention

The field of the invention is data processing, or, more specifically, methods, systems, and products for memory mapping to reduce cache conflicts in multiprocessor systems.

2. Description of Related Art

Many computer systems employ a multilevel hierarchy of memory systems, with fast but limited capacity memory at the highest level of the hierarchy and proceeding to slower but higher capacity memory at the lowest level of the hierarchy. Such a memory hierarchy typically includes a small fast memory called a cache, either physically integrated within a processor integrated circuit or mounted physically close to the processor for speed. There may be multiple levels of caches, often referred to as Level 1 or L1, Level 2 or L2, and so on.

A memory hierarchy is useful only if a high percentage of items requested from memory are present in the highest levels of the hierarchy when requested. If a processor requests an item from a cache and the item is present in the cache, the event is called a cache hit. If a processor requests an item from a cache and the item is not present in the cache, the event is called a cache miss. In the event of a cache miss, the requested item is retrieved from a lower level of the memory hierarchy. Cache misses have a significant impact on performance. In general, minimization of cache misses and minimization of the effects of cache misses are some of the most important design parameters for overall computer system performance.

The minimum amount of memory that can be transferred between a cache and a next lower level of the memory hierarchy is called a "line," or sometimes a "block." A real memory is typically organized in bytes of eight bits, or in words (for example, 32 bits per word), and a cache line is typically multiple words (for example, 16 words per line). Memory typically also is organized into pages, with multiple lines per page.

If a cache stores an entire line address along with the data, any line can be placed anywhere in the cache. A space saving alternative is to organize a cache with a subset of a memory address, called an index. In a cache with indexing, an item with a particular real memory address can be placed in the cache only at the one place within the cache designated by the index. In addition, every item within the address space having identical index bits will potentially require the same line space within the cache. A new line may be fetched that requires the same space in the cache as an existing line and the existing line may need to stay in the cache. This condition is called a conflict, and is discussed in more detail below.

If a line can appear at only one place in the cache, the cache is said to be direct mapped (and is said to have low associativity). In an alternative design, a cache may be organized into sets, each set containing two or more lines. If a line can be placed in only one of the sets, the cache is said to be set associative. If a line can be placed anywhere in the cache, the cache is said to be fully associative. In general, caches having low associativity are simpler, faster and require less space than caches having high associativity.

Direct mapped or other low associativity caches may have performance problems, however, due to conflicts as discussed below.

For a direct mapped cache or other low associativity cache, a new line may require the same space as an existing line. That is, instead of displacing lines randomly, or displacing the least recently used line, the new line displaces the line having the same index within the cache. The displaced line may be useful and may need to stay in the cache. A miss resulting from a useful line being displaced by a line having the same index is called a conflict miss. In executing some software, a second line may displace a first line, only to have the first line soon displace the second line. This thrashing of a single cache line can result in low system performance, even though the cache size is adequate for the particular software.

Destructive cache interference from conflict misses can occur in any environment that supports multiprocessing, where different execution contexts operate in a time-shared manner on the same physical processor and share the same cache hierarchy. Examples of such multiprocessing environments include simultaneous multithreading ("SMT") environments and shared processor logical partitioning ("SPLPAR") environment. In fact, SMT and SPLPAR particularly exacerbate destructive cache interference. In the case of SMT, interleaving of different contexts of execution is carried out a very fine granularity, often within a dispatch cycle, resulting in increased cache interference. In the case of SPLPAR, a single physical processor and its associated cache hierarchy is shared by multiple operating system images, with no data shared between the different operating system images. In SPLPAR environments, therefore, all cache sharing results in destructive interference.

There is an ongoing need to improve system ability to provide the speed and space advantages of low associativity caches while minimizing the negative effects on system performance due to conflict misses. One approach to reducing the impact of conflict misses in direct mapped caches, for example, is to add a small fully associative secondary cache. This approach may include loading the small secondary cache with the displaced victim of a miss, calling the resulting secondary cache a victim cache.

Software approaches for reducing conflict misses include page mapping techniques such as page coloring and bin hopping. While these techniques have been shown to reduce cache conflicts when a physical cache is shared by different threads of execution belonging to the same operating system image, they do not address the case where different operating system images may share the same physical cache. There is a further ongoing need therefore for improvement in operating system policies in multiprocessor systems in which multiple operating system images use the same physical cache.

SUMMARY OF THE INVENTION

Methods, systems, and computer program products are disclosed for mapping a virtual memory page to a real memory page frame in a multiprocessing environment that supports a multiplicity of operating system images. Typical embodiments include retrieving into an operating system image, from memory accessible to a multiplicity of operating system images, a most recently used cache color for a cache, where the cache is shared by the operating system image with at least one other operating system image; selecting a new cache color in dependence upon the most recently used cache color; selecting in the operating system image a page frame in dependence upon the new cache color; and storing in the memory the new cache color as the most recently used cache color for the cache.

In typical embodiments, retrieving a most recently used cache color for a cache includes retrieving a most recently used cache color for a cache from a hypervisor. In typical embodiments, cache color comprises a predetermined range of bits in a real memory address. In many embodiments, cache color comprises an intersection of a page frame number and a cache index for a real memory address. In typical embodiments, selecting a new cache color in dependence upon the most recently used cache color is carried out by incrementing the value of the most recently used cache color.

In many embodiments, selecting in the operating system image a page frame in dependence upon the new cache color is carried out by searching for a free page frame of the new cache color and, if a page frame of the new cache color is found, storing the page frame number of the found page frame in association with a virtual page number. Typical embodiments also include allocating a range of virtual memory to an operating system image and receiving in the operating system image a request to access a virtual memory page not yet mapped to a page frame. In typical embodiments, storing in the memory the new cache color as the most recently used cache color for the cache further comprises calling a function in a hypervisor.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for memory mapping to reduce cache conflicts in multiprocessor systems. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including, for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Detailed Description

Figure 1:
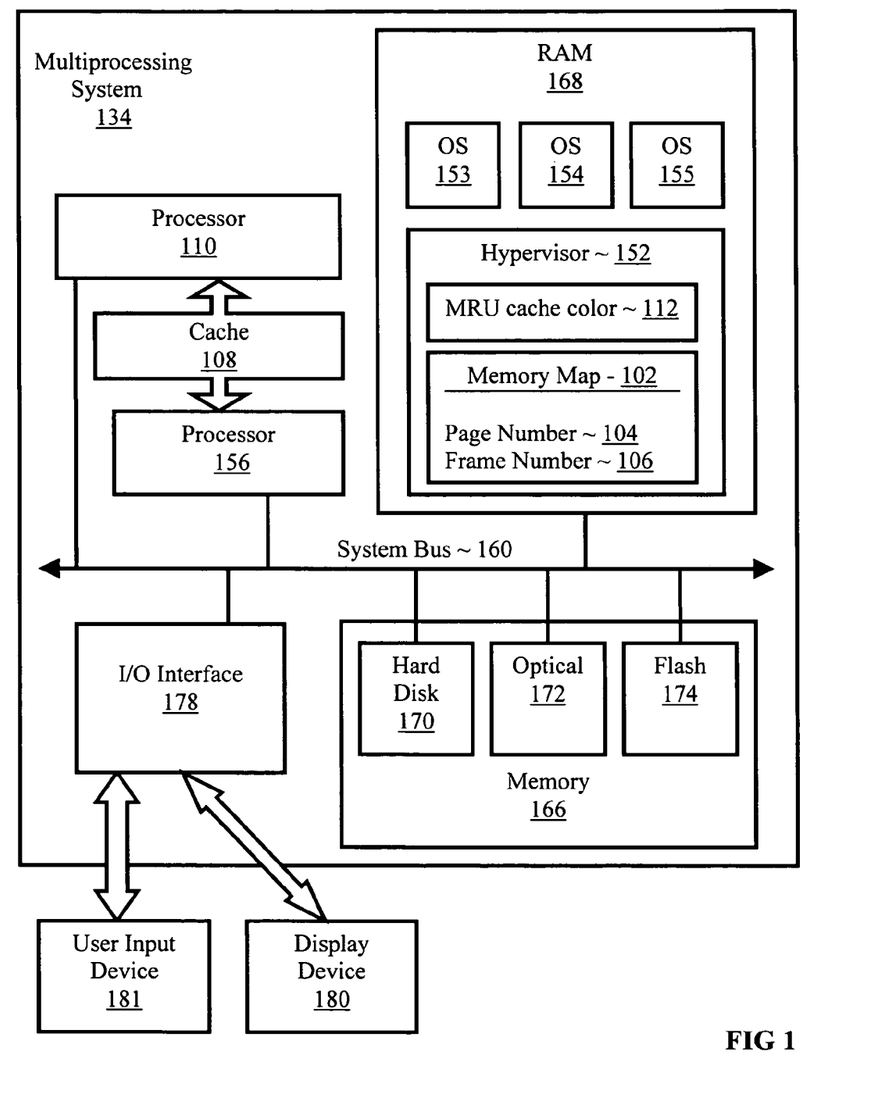
FIG. 1 sets forth a block diagram of exemplary automated computing machinery comprising in which memory is mapped to reduce cache conflicts according to embodiments of the present invention.

Exemplary methods, systems, and products are disclosed with reference to the accompanying drawings for mapping a virtual memory page to a real memory page frame in a multiprocessing environment that supports a multiplicity of operating system images, beginning with FIG. 1. As will be explained with reference to FIG. 1, methods, systems, and products according to embodiments of the present invention operate generally by retrieving into an operating system image from memory accessible to a multiplicity of operating system images a most recently used cache color for a cache, where the cache is shared by the operating system image with at least one other operating system image. Typical embodiments then operate by selecting a new cache color in dependence upon the most recently used cache color, selecting in the operating system image a page frame in dependence upon the new cache color, and storing in the memory the new cache color as the most recently used cache color for the cache.

FIG. 1 sets forth a block diagram of exemplary automated computing machinery comprising a multiprocessing computer system 134 in which memory is mapped to reduce cache conflicts according to embodiments of the present invention. The multiprocessing system 134 of FIG. 1 includes at least two computer processors (110, 156). The multiprocessing system of FIG. 1 includes a cache memory (108) which in this example is shared by two processors. Two processors sharing a cache is for explanation, not for limitation. Within the scope of the present invention, a cache may be used by one or more processors.

The multiprocessing system of FIG. 1 includes random access memory ("RAM") (168). Stored in RAM (168) are three operating system images (153, 154, 155). The number of three operating system images is for explanation, not for limitation. Within the scope of the present invention, any number of operating system image may coexist. Moreover, within the scope of the present invention, there is no required relationship among operating system images and processors. One or more operating system images may be implemented on each processor. Each processor may real or virtual. Operating systems useful in multiprocessing systems according to embodiments of the present invention include Unix, Linux, Microsoft NT™, and many others as will occur to those of skill in the art.

The multiprocessing system of FIG. 1 includes a hypervisor (152). A hypervisor is a software layer that implements virtual machines having the same instruction set architecture as the hardware on which the hypervisor executes. Because the virtual machine's instruction-set architecture is indistinguishable from the bare hardware, software run on a virtual machine cannot tell whether a hypervisor is present. One example of a hypervisor is IBM's CP-67 for System 370 mainframes. A hypervisor allows multiple operating systems or multiple versions of the same operating system to coexist on a single physical processor. Even when virtual machines all execute the same operating system, a hypervisor provides an isolation that simplifies protection and sharing. A hypervisor is useful in many embodiments of the present invention because it can support coordination of most recently used cache colors among operating system images with no need for modifications to hardware or application programs and with little modification of the operating systems. A hypervisor serves as a manager of platform resources in many multiprocessing environments according to embodiments of the present invention, providing the ability for the operating system images to cooperate with each other to minimize cache conflicts.

In the example of FIG. 1, a hypervisor (152) includes a most recently used cache color (112) and a memory map (102) that associates virtual memory page number (104) and real memory frame numbers (106). Computer program instructions for memory mapping to reduce cache conflicts according to embodiments of the present invention may be implemented partly in operating systems and partly in a hypervisor. That is, in many embodiments of the present invention, memory mapping to reduce cache conflicts is carried out in a coordinated way by operating system images and a hypervisor working together. In the exemplary system of FIG. 1, for example, when an operating system image shares a cache with at least one other operating system image, such an operating system may retrieve from memory accessible to a multiplicity of operating system images a most recently used cache color for a cache. In such an example, memory accessible to a multiplicity of operating system images is memory administered by a hypervisor to store most recently used color values for each cache on the system, and an operating system image may retrieve a most recently used cache color for a cache by use of call to a function in the hypervisor. Such a function may be exposed by the hypervisor as a function in an API. Such a function appears to the operating system image as any other operating system call.

In such an example, the operating system image selects a new cache color in dependence upon the most recently used cache color. Selecting a new cache color in dependence upon the most recently used cache color is typically carried out by incrementing the most recently used cache color to form a new cache color. In this example, the operating system image selects a page frame in dependence upon the new cache color. The operating system image selects a page frame in dependence upon the new cache color by searching for an unmapped frame of the same color as the new cache color. If no unmapped frame of the same color is available, the operating system image may increment the new cache color to create another new cache color and search again for an unmapped page frame with the same color.

When a matching unmapped page frame is found, the operating system image stores in the memory the new cache color as the most recently used cache color for the cache. The memory again is the memory administered by the hypervisor to store most recently used cache color for the caches on the system. The operating system image may store the new cache color as the most recently used cache color for its cache by a call to a function exposed from the hypervisor in an API. To the extent that hypervisor administers the memory map (102), the operating system image is already programmed to report the new mapping of a page frame to a virtual memory page. The hypervisor may then extract the new color from the page frame value and store it as the most recently used color for the corresponding cache.

The multiprocessing system 134 of FIG. 1 includes computer memory 166 coupled through a system bus 160 to the processors (110, 156) and to other components of the computer. Computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 1 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

Figure 2:
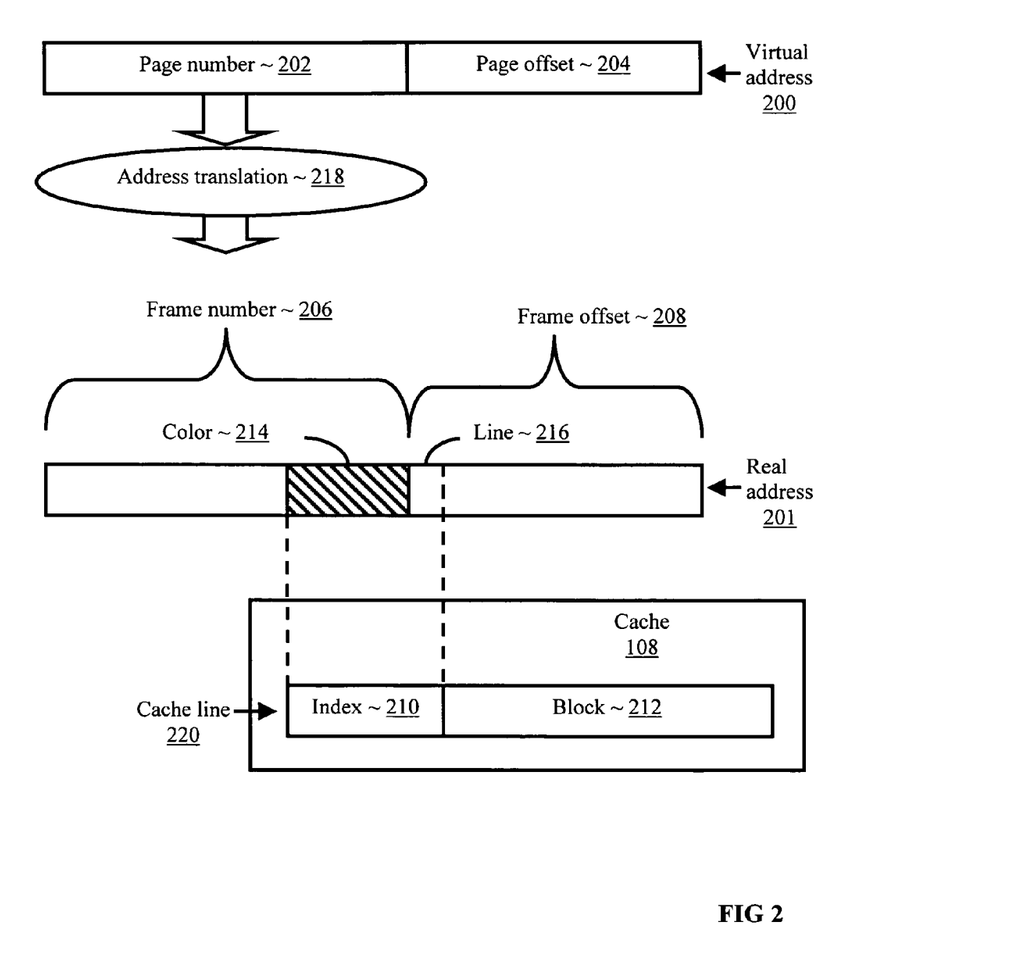
FIG. 2 sets forth a block diagram illustrating mapping virtual memory to real memory and to cache memory.

For further explanation, FIG. 2 sets forth a block diagram illustrating mapping virtual memory to real memory and to cache memory. In the example of FIG. 2, a virtual memory address (200) includes a page number (202) and a page offset (204). The offset portion of the address represents memory capacity for all addresses in a page. That is, for a page size of 4 KB, the offset requires 12 bits. In a 4 GB virtual address space (a 32 bit memory address space), therefore, having a 4 KB page size, the offset resides in the twelve bits 0–11, and the page number resides in the 20 bits 12–31. In a 4 GB virtual address space having a page size of 4 KB, there are $2^{20}$ or 1,048,576 pages. In the example of FIG. 2, address translation (218) converts a virtual page number (202) to a frame number (206) of a real memory address (201). In this example, address translation (218) is carried out by use of a lookaside buffer or a main memory map on the page number only. The page offset is not translated. The frame offset (208) in the real memory address (201) retains the value of the page offset (204).

The example of FIG. 2 includes a cache (108) that includes memory blocks addressed with a portion of a real memory address. The portion of a real memory address that forms the address of a cache block is called an "index." Cache blocks are a portion of a real memory page sometimes also referred to as a cache "line." In the example of FIG. 2, cache (108) is indexed (210) with index values from a portion (214, 216) of real memory address (201). In this example, the index (210) is made of the two most significant digits of the frame offset (208) and the eight least significant bits (214) of the frame number (206), yielding a 10 bit cache index capable of addressing 1024 cache lines. The eight least significant bits (214) of the frame number (206) identify "cache color" or simply "color." Cache color in this example is taken as a predetermined range of bits, that is, bits 12–21, in a real memory address. Moreover in this example, cache color is represented by the bits in the intersection of a page frame number (206) and a cache index (210) for a real memory address (201). If the intersection is empty the system supports one color, if the intersection contains one bit there are two colors, and so on.

Figure 3:
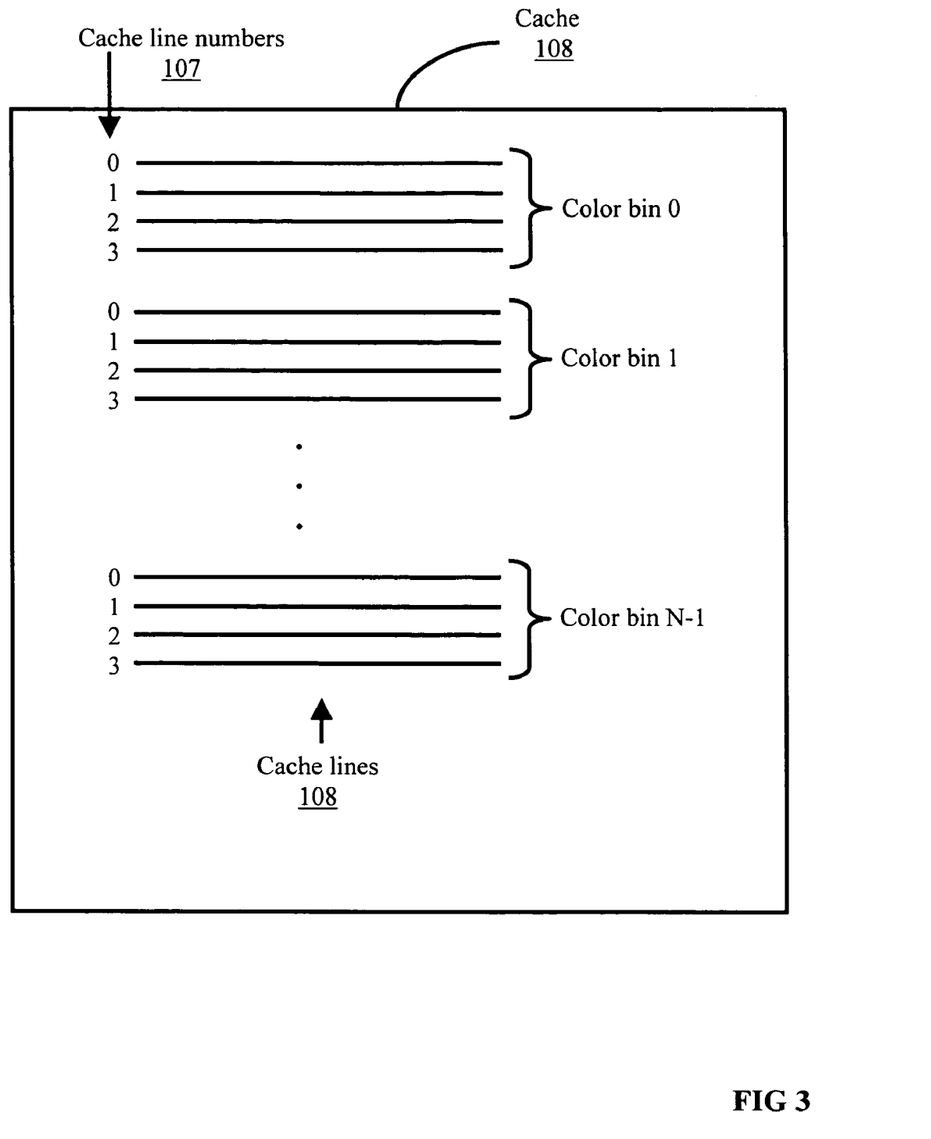
FIG. 3 is a block diagram of an exemplary cache structure resulting from indexing a cache as illustrated by FIG. 2.

A cache index constructed as shown in FIG. 2 results in a cache structured as shown in FIG. 3. FIG. 3 is a block diagram of an exemplary cache structure resulting from indexing a cache as illustrated by FIG. 2. The color bits form logical "bins" of memory, each of which contains cache lines (108). Each cache line is uniquely identified by an index value, and each cache line is identified within a color bin by a line number (107) made of the intersection (216 on FIG. 2) of the index (210) and the offset (208) in the real address (201).

Figure 4:
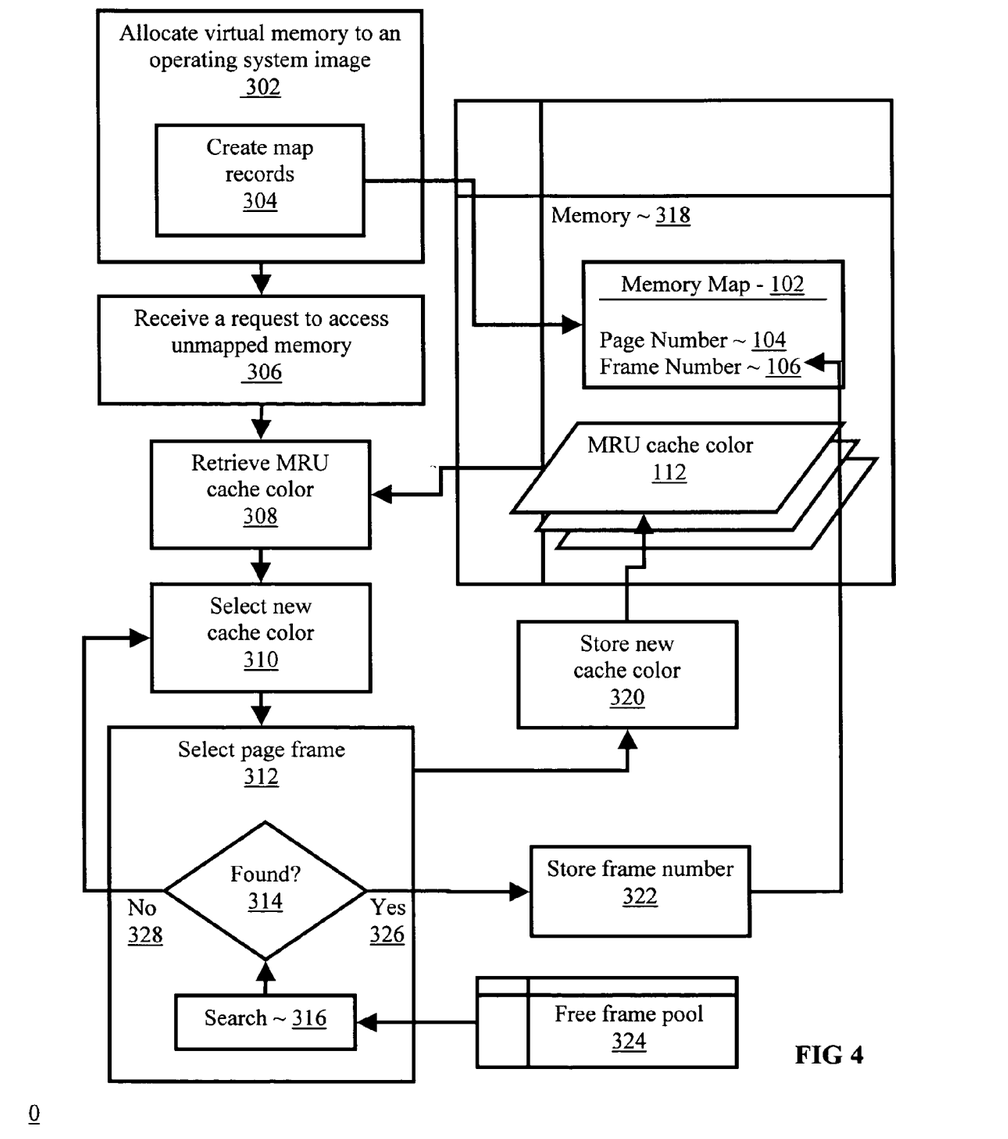
FIG. 4 sets forth a flow chart illustrating an exemplary method for mapping a virtual memory page to a real memory page frame in a multiprocessing environment that supports a multiplicity of operating system images.

For further explanation, FIG. 4 sets forth a flow chart illustrating an exemplary method for mapping a virtual memory page to a real memory page frame in a multiprocessing environment that supports a multiplicity of operating system images. The method of claim 1 includes allocating (302) a range of virtual memory to an operating system image and receiving (306) in the operating system image a request to access a virtual memory page not yet mapped to a page frame. When an application requests an allocation of virtual memory, the allocation may be accomplished by establishing entries in a memory map or page table for the virtual memory space allocated. Actual mapping of a virtual page to a real memory frame may not occur until the application first accesses a memory address in a virtual page.

The method of FIG. 4 includes retrieving (308) into an operating system image, from memory (318) accessible to a multiplicity of operating system images, a most recently used cache color (112) for a cache. In the example of FIG. 4, a cache is shared by an operating system image with at least one other operating system image. In the method of FIG. 4, retrieving (308) a most recently used cache color (112) for a cache may be carried out by retrieving a most recently used cache color for a cache from a hypervisor such as the hypervisor described above with reference to FIG. 1. In the example of FIG. 4, such a hypervisor may maintain an array of most recently used cache colors for each cache shared by operating system images in a multiprocessing system, in, for example, an array named cache_color[0 . . . n−1], where n is the number of caches shared by operating system images in the system.

In the method of FIG. 4, retrieving (308) into an operating system image, from memory (318) accessible to a multiplicity of operating system images, a most recently used cache color (112) for a cache is carried out by making an API function call exposed to the operating system by the hypervisor, such as for example, a new function named H_COLOR_GET, made available to operating system images by a hypervisor in a multiprocessing environment, which returns the value of cache_color[i], where 'i' is an integer identifying a cache shared by an operating system image in which a calling virtual process is currently dispatched.

The method of FIG. 4 also includes selecting (310) a new cache color in dependence upon the most recently used cache color (112). In the method of FIG. 4, selecting (310) a new cache color in dependence upon the most recently used cache color (112) may be carried out by incrementing the value of the most recently used cache color (112). In the method of FIG. 4, the new cache color is therefore cache_color=(cache_color[i]+1) for cache colors equal to or less than the number of colors in use in the system. Alternatively, where k is the number of colors supported by the system, the new cache color may be (cache_color[i]+1) mod (k−1) for values of cache_color[i] greater than k−1. In this example, if the incremented color is greater than the maximum number of colors, then the method of FIG. 4 may reset the cache color value to 0, or, according to the alternative just mentioned, may calculate the new cache color by incrementing the most recently used color and taking its modulus with the number of colors minus one.

The method of FIG. 4 also includes selecting (312) in the operating system image a page frame in dependence upon the new cache color. In the method of FIG. 4, selecting (312) in the operating system image a page frame in dependence upon the new cache color may include searching (316) for a free page frame of the new cache color and, if a page frame of the new cache color is found (326), storing (322) the page frame number (106) of the found page frame in association with a virtual page number (104). In the example of FIG. 4, searching (316) for a free page frame is carried out in a free frame pool (324) maintained by an operating system image or a hypervisor. In the method of FIG. 4, storing (322) the page frame number (106) of the found page frame in association with a virtual page number (104) is carried out by calling a function exposed to the operating system in an API such as for example, H_ENTER in IBM's PowerPC environment.

In the example of the H_ENTER call, there is no need to modify the operating system to provide the new cache color as a parameter because the new cache color is implicit in the mapped frame number and therefore, can be extracted by the hypervisor to update the most recently used cache color. As an alternative to allowing the hypervisor to extract from a mapped frame number the most recently used color for a cache, a hypervisor may expose through an API a new function particularly for the purpose of notifying the hypervisor of an update value for a most recently used cache color for a cache. For environments in which a hypervisor exposes a new function for the purpose of notifying the hypervisor of an update value for a most recently used cache color for a cache, operating systems to be run in such an environment are modified to communicate the update value through use of the new function.

If, in searching (316) for a free page frame of the new cache color, the operating system image can find no page frame of the new cache color (328), the operating system image selects another new cache color. The operating system image may select another new cache color, for example, by incrementing the new cache color and searching (316) for a free page frame of the new cache color.

The method of FIG. 4 also includes storing (320) in the memory (318) the new cache color as the most recently used cache color (112) for the cache. In the method of FIG. 4, storing (320) in the memory (318) the new cache color as the most recently used cache color (112) for the cache may be carried out by calling a function in a hypervisor.

The method of FIG. 4 advantageously reduces the effect of destructive cache interference on multiprocessing performance by advantageously allowing operating system images in different logical partitions to cooperate with each other. Readers of skill in the art will now recognize that methods, systems and products according to embodiments of the present invention can be implemented with victim caches. A victim cache is a small fully associative cache that reduces the effect of conflict misses by saving the blocks most recently thrown out of another cache. Readers of skill in the art will also recognize that methods, systems, and products according to embodiments of the present invention can also be implemented with memory affinity. For example, the set of all free page frames could be organized into affinity-based buckets, and each such bucket could consist of k sub-buckets, one for each color. The operating system image attempts to allocate a free page frame within the appropriate affinity domain, of the appropriate color. If the operating system image fails to find a frame of color=cache_color[i]+1, it tries the next color and so on until it finds a free page frame within the same affinity domain.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for mapping a virtual memory page to a real memory page frame in a multiprocessing environment that supports a multiplicity of operating system images, the method comprising:
   retrieving into an operating system image, from memory accessible to a multiplicity of operating system images, a most recently used cache color for a cache, wherein the cache is shared by the operating system image with at least one other operating system image;
   selecting a new cache color in dependence upon the most recently used cache color;
   selecting in the operating system image a page frame in dependence upon the new cache color; and
   storing in the memory the new cache color as the most recently used cache color for the cache.

2. The method of claim 1 wherein retrieving a most recently used cache color for a cache further comprises retrieving a most recently used cache color for a cache from a hypervisor.

3. The method of claim 1 wherein cache color comprises a predetermined range of bits in a real memory address.

4. The method of claim 1 wherein cache color comprises an intersection of a page frame number and a cache index for a real memory address.

5. The method of claim 1 wherein selecting a new cache color in dependence upon the most recently used cache color further comprises incrementing the value of the most recently used cache color.

6. The method of claim 1 wherein selecting in the operating system image a page frame in dependence upon the new cache color further comprises:
   searching for a free page frame of the new cache color;
   if a page frame of the new cache color is found, storing the page frame number of the found page frame in association with a virtual page number.

7. The method of claim 1 further comprising:
   allocating a range of virtual memory to an operating system image; and
   receiving in the operating system image a request to access a virtual memory page not yet mapped to a page frame.

8. The method of claim 1 wherein storing in the memory the new cache color as the most recently used cache color for the cache further comprises calling a function in a hypervisor.

9. A system for mapping a virtual memory page to a real memory page frame in a multiprocessing environment that supports a multiplicity of operating system images, the system comprising:
   means for retrieving into an operating system image, from memory accessible to a multiplicity of operating system images, a most recently used cache color for a cache, wherein the cache is shared by the operating system image with at least one other operating system image;
   means for selecting a new cache color in dependence upon the most recently used cache color;
   means for selecting in the operating system image a page frame in dependence upon the new cache color; and
   means for storing in the memory the new cache color as the most recently used cache color for the cache.

10. The system of claim 9 wherein means for retrieving a most recently used cache color for a cache further comprises means for retrieving a most recently used cache color for a cache from a hypervisor.

11. The system of claim 9 wherein means for selecting a new cache color in dependence upon the most recently used cache color further comprises means for incrementing the value of the most recently used cache color.

12. The system of claim 9 wherein means for selecting in the operating system image a page frame in dependence upon the new cache color further comprises:
   means for searching for a free page frame of the new cache color; and
   means for storing the page frame number of the found page frame in association with a virtual page number.

13. The system of claim 9 further comprising:
   means for allocating a range of virtual memory to an operating system image; and
   means for receiving in the operating system image a request to access a virtual memory page not yet mapped to a page frame.

14. The system of claim 9 wherein means for storing in the memory the new cache color as the most recently used cache color for the cache further comprises means for calling a function in a hypervisor.

15. A computer program product for mapping a virtual memory page to a real memory page frame in a multiprocessing environment that supports a multiplicity of operating system images, the computer program product comprising:
   a recording medium;
   means, recorded on the recording medium, for retrieving into an operating system image, from memory accessible to a multiplicity of operating system images, a most recently used cache color for a cache, wherein the cache is shared by the operating system image with at least one other operating system image;
   means, recorded on the recording medium, for selecting a new cache color in dependence upon the most recently used cache color;
   means, recorded on the recording medium, for selecting in the operating system image a page frame in dependence upon the new cache color; and
   means, recorded on the recording medium, for storing in the memory the new cache color as the most recently used cache color for the cache.

16. The computer program product of claim 15 wherein means, recorded on the recording medium, for retrieving a most recently used cache color for a cache further comprises means, recorded on the recording medium, for retrieving a most recently used cache color for a cache from a hypervisor.

17. The computer program product of claim 15 wherein means, recorded on the recording medium, for selecting a new cache color in dependence upon the most recently used cache color further comprises means, recorded on the recording medium, for incrementing the value of the most recently used cache color.

18. The computer program product of claim 15 wherein means, recorded on the recording medium, for selecting in the operating system image a page frame in dependence upon the new cache color further comprises:
   means, recorded on the recording medium, for searching for a free page frame of the new cache color; and
   means, recorded on the recording medium, for storing the page frame number of the found page frame in association with a virtual page number.

19. The computer program product of claim 15 further comprising:
    means, recorded on the recording medium, for allocating a range of virtual memory to an operating system image; and
    means, recorded on the recording medium, for receiving in the operating system image a request to access a virtual memory page not yet mapped to a page frame.

20. The computer program product of claim 15 wherein means, recorded on the recording medium, for storing in the memory the new cache color as the most recently used cache color for the cache further comprises means, recorded on the recording medium, for calling a function in a hypervisor.

* * * * *